(12) United States Patent
Nunome et al.

(10) Patent No.: US 8,206,851 B2
(45) Date of Patent: Jun. 26, 2012

(54) AA ALKALINE BATTERY AND AAA ALKALINE BATTERY

(75) Inventors: Jun Nunome, Kyoto (JP); Kato Fumio, Osaka (JP); Harunari Shimamura, Osaka (JP)

(73) Assignee: Panasonic Corporation, Osaka (JP)

( * ) Notice: Subject to any disclaimer, the term of this patent is extended or adjusted under 35 U.S.C. 154(b) by 590 days.

(21) Appl. No.: 12/416,619

(22) Filed: Apr. 1, 2009

(65) Prior Publication Data

US 2009/0263720 A1     Oct. 22, 2009

(30) Foreign Application Priority Data

Apr. 18, 2008  (JP) ................................ 2008-109364

(51) Int. Cl.
*H01M 4/50* (2010.01)
*H01M 4/66* (2006.01)
(52) U.S. Cl. ........................ 429/224; 429/232
(58) Field of Classification Search ................. 429/224, 429/232
See application file for complete search history.

(56) References Cited

U.S. PATENT DOCUMENTS

| | | | |
|---|---|---|---|
| 5,283,139 A * | 2/1994 | Newman et al. | 429/224 |
| 5,366,832 A | 11/1994 | Hayashi et al. | |
| 6,258,480 B1 | 7/2001 | Moriwaki et al. | |
| 2006/0257728 A1 * | 11/2006 | Mortensen et al. | 429/144 |
| 2008/0070114 A1 * | 3/2008 | Kato et al. | 429/206 |
| 2008/0274409 A1 | 11/2008 | Harada et al. | |

FOREIGN PATENT DOCUMENTS

| | | |
|---|---|---|
| JP | 60-180058 | 9/1985 |
| JP | 06-163024 | 6/1994 |
| JP | 09-180708 | 7/1997 |
| JP | 11-144690 | 5/1999 |
| JP | 2000-100394 | 4/2000 |
| JP | 2002-075338 | 3/2002 |
| JP | 2006-032320 | 2/2006 |
| WO | WO 94/24709 | 10/1994 |

OTHER PUBLICATIONS

Davis et al., "Defining high power EMD through porosimetry," 2005, Journal of Power Sources, 139, pp. 342-350.*

* cited by examiner

*Primary Examiner* — Emily Le
*Assistant Examiner* — Brittany Martinez
(74) *Attorney, Agent, or Firm* — McDermott Will & Emery LLP

(57) ABSTRACT

An AA alkaline battery includes a positive electrode containing larger than or equal to 9.30 g of manganese dioxide. An AAA alkaline battery includes a positive electrode containing larger than or equal to 4.09 g of manganese dioxide. The cumulative pore volume of pores having diameters from 0.97 μm to 10.2 μm, both inclusive, is in the range from 0.0035 ml/g to 0.0070 ml/g, both inclusive, in measurement of pore size distribution in the positive electrode performed by mercury intrusion porosimetry.

6 Claims, 1 Drawing Sheet

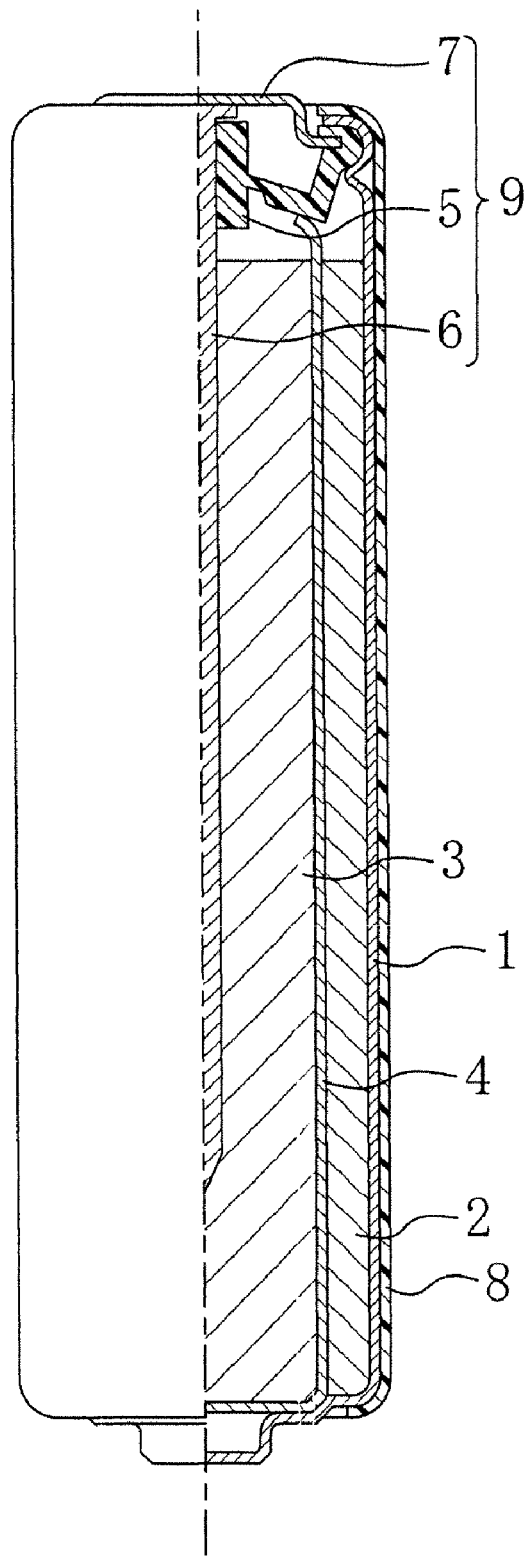

AA ALKALINE BATTERY AND AAA ALKALINE BATTERY

CROSS-REFERENCE TO RELATED APPLICATION

This application claims priority from Japanese Patent Application No. JP2008-109364 filed on Apr. 18, 2008, which is hereby incorporated by reference in its entirety for all purposes.

BACKGROUND

The present disclosure relates to AA alkaline batteries and AAA alkaline batteries.

Alkaline batteries have larger capacity than manganese batteries. However, further increase in the capacity of the alkaline batteries is still required. To this end, various techniques such as a technique of loading with positive and negative electrode active materials at higher densities and a technique of fully utilizing the space in a battery case while maintaining the external dimensions of the battery case within the standards are proposed.

Alkaline batteries have been conventionally used in a small current (hereinafter, referred to as low-rate current) range of 100 mA or less. However, to meet a recent demand for driving digital still cameras or the like with alkaline batteries, the use of alkaline batteries in a large current (hereinafter, referred to as high-rate current) range of 500 mA or more has been investigated. Under this circumstance, some alkaline batteries are designed with a focus on enhancement of discharge characteristics in the high-rate current range. For such alkaline batteries, a technique of increasing the porosity in a positive electrode material mixture so as to store a larger amount of an electrolyte in a positive electrode, for example, has been studied.

For example, Japanese Laid-Open Patent Publication No. 9-180708 discloses that the use of a positive electrode material mixture pellet having a pore quantity ranging from 0.14 cc/g to 0.24 cc/g, both inclusive, as a positive electrode enhances discharge characteristics in the high-rate current range.

In addition, International Publication WO 94/024709 discloses that setting the zinc density at 1.4 g or more per 1 (one) $cm^3$ of a negative electrode volume and the manganese dioxide density at 2.7 g or more per 1 (one) $cm^3$ of a positive electrode volume allows the capacity of each of the positive and negative electrodes to be 0.48 Ah or more per 1 (one) $cm^3$ of the internal volume of the battery.

Further, Japanese Laid-Open Patent Publication No. 2002-75338 discloses that the amounts of a positive electrode active material and an electrolyte are both increased in order to increase the discharge capacity of a battery and to enhance discharge characteristics of the battery in the high-rate current range. Specifically, a positive electrode material mixture contains a positive electrode active material and a conductive agent and also contains fine gaps. This positive electrode material mixture is formed in such a manner that fine cracks occurring in the positive electrode material mixture when an electrolyte is held therein first appear between particles of the positive electrode material mixture.

SUMMARY

With recent widespread use of portable audio video (AV) equipment and electronic game machines, there has been an increasing demand for using alkaline batteries also in a region of a so-called current at an approximately intermediate level (hereinafter, referred to as "middle-rate current") from about 100 mA to about 500 mA (especially, around 250 mA). Therefore, it is required to enhance discharge characteristics of alkaline batteries in the middle-rate current range, especially to enhance discharge characteristics of alkaline batteries in the case of performing intermittent discharge in the middle-rate current range. However, it is difficult for the techniques disclosed in the aforementioned three patents to enhance discharge characteristics of alkaline batteries in the middle-rate current range.

An example AA alkaline battery of this disclosure includes a positive electrode containing larger than or equal to 9.30 g of manganese dioxide. In this battery, a cumulative pore volume of pores having diameters from 0.97 μm to 10.2 μm, both inclusive, is in the range from 0.0035 ml/g to 0.0070 ml/g, both inclusive, in measurement of pore size distribution in the positive electrode performed by mercury intrusion porosimetry. The weight of manganese dioxide herein is the weight of manganese dioxide based on the assumption that the purity of manganese dioxide is 100%, and is the weight obtained by multiplying the weight of an actually-used manganese dioxide material by the purity (e.g., 92.2% in the case of electrolytic manganese dioxide used herein) of manganese dioxide.

Such an AA alkaline battery contains a larger amount of manganese dioxide than a conventional battery. As a result, the capacity can be increased.

In addition, in the positive electrode of the AA alkaline battery, diffusion paths for an electrolyte during discharge can be assured. As a result, discharge characteristics of the AA alkaline battery in the middle-rate current range can be enhanced.

In the example AA alkaline battery, the positive electrode preferably contains graphite in the range from 4.5 wt % to 7.0 wt %, both inclusive, of a weight of manganese dioxide contained in the positive electrode. Then, electron paths can be assured in the positive electrode.

In the example AA alkaline battery, a discharge capacity per a unit weight of manganese dioxide contained in the positive electrode is preferably larger than or equal to 230 mAh/g in the case of performing intermittent discharge with a current of 250 mA in an atmosphere of 20° C. for one hour per a day.

In the same manner, an example AAA alkaline battery of this disclosure includes a positive electrode containing larger than or equal to 4.09 g of manganese dioxide. In this battery, a cumulative pore volume of pores having diameters from 0.97 μm to 10.2 μm, both inclusive, is in the range from 0.0035 ml/g to 0.0070 ml/g, both inclusive, in measurement of pore size distribution in the positive electrode performed by mercury intrusion porosimetry.

Such an AAA alkaline battery can have higher capacity, and enhance its discharge characteristics in the middle-rate current range, in the same manner as the example AA alkaline battery described above.

In the example AAA alkaline battery, the positive electrode preferably contains graphite in the range from 4.5 wt % to 7.0 wt %, both inclusive, of a weight of manganese dioxide contained in the positive electrode.

In the example AAA alkaline battery, discharge capacity per a unit weight of manganese dioxide contained in the positive electrode is preferably larger than or equal to 260 mAh/g in the case of performing intermittent discharge with a current of 100 mA in an atmosphere of 20° C. for one hour per a day.

BRIEF DESCRIPTION OF THE DRAWINGS

The FIGURE is a half sectional view illustrating an alkaline battery according to an embodiment of the present invention.

DETAILED DESCRIPTION

Prior to the description of an embodiment of the present invention, it is explained how inventors of the present invention have reached the invention. Hereinafter, a battery applicable to only an AA alkaline battery or an AAA alkaline battery will be referred to as an "AA alkaline battery" or an "AAA alkaline battery", and a battery applicable to both of an AA alkaline battery and an AAA alkaline battery will be simply referred to as an "alkaline battery".

It is known that an increase in the loading weight of manganese dioxide can enhance discharge characteristics of an alkaline battery in the low-rate current range. In view of this, the inventors estimated that not only discharge characteristics of an alkaline battery in the low-rate current range but also discharge characteristics of the alkaline battery in the middle-rate current range can be enhanced by increasing the loading weight of manganese dioxide. However, in practice, it was found that the increase in the loading weight of manganese dioxide cannot sufficiently enhance the discharge characteristics of the alkaline battery in the middle-rate current range. The inventors assumed that this is because of the following reasons:

In a positive electrode of an alkaline battery, gaps are present between manganese dioxide particles or between manganese dioxide particles and conductive agent particles, and an alkaline electrolyte is diffused in the positive electrode through the gaps. If the diffusion rate of the alkaline electrolyte is sufficiently higher than the rate of discharge reaction of the alkaline battery, all $MnO_2$ contained in the positive electrode substantially uniformly reacts as:

(Positive electrode) $MnO_2 + H^+ + e^- \rightarrow MnOOH$

As shown in this reaction equation, when the alkaline battery is discharged, $MnO_2$ changes into $MnOOH$ in the positive electrode. At this time, $H^+$ is captured in the crystal lattice of manganese dioxide, causing the crystal lattice of manganese dioxide to be expanded. Accordingly, manganese dioxide particles are also expanded, and thus the gaps in the positive electrode become smaller, resulting in a decrease in the diffusion rate of the alkaline electrolyte. With the decrease in the diffusion rate of the alkaline electrolyte in the positive electrode, polarization (i.e., a drop of the positive electrode potential) increases as the current value increases. Accordingly, although polarization is small with a small current value (i.e., in the low-rate current range) and allows discharge to be performed, polarization is increased with a larger current value (i.e., in the middle-rate current range) and prevents discharge performance from being sufficiently enhanced.

It is considered that the expansion of the crystal lattice of manganese dioxide increases as the depth of discharge increases and that diffusion of the electrolyte becomes extremely difficult when the depth of discharge exceeds around 65% of the theoretical capacity of manganese dioxide. In the case of discharge in the middle-rate current range, a large current exceeding 100 mA is caused to flow with such a depth of discharge, and therefore, polarization in the positive electrode increases, resulting in difficulty in increasing the discharge capacity.

From the foregoing consideration, the diffusion rate of the electrolyte necessary for discharge reaction is relatively low in the low-rate current range, and thus the availability of the alkaline battery is close to 100% even with expansion of manganese dioxide due to discharge as long as the positive electrode is loaded with a large amount of manganese dioxide. On the other hand, in the middle-rate current range, when manganese dioxide is expanded by discharge, it becomes difficult to ensure a sufficient diffusion rate of the electrolyte necessary for electrode reaction, and thus polarization increases. As a result, discharge characteristics of the alkaline battery deteriorate.

In addition, when the loading weight of manganese dioxide is increased as compared to conventional batteries, gaps originally contained in the positive electrode before discharge become small and, moreover, expansion of manganese dioxide is promoted as the discharge continues. Accordingly, the gaps in the positive electrode more greatly shrink, thus causing a further decrease in the diffusion rate of the alkaline electrolyte in the positive electrode. Therefore, the use of an alkaline battery exhibiting a larger loading weight of manganese dioxide than a conventional battery in the middle-rate current range further reduces the availability of the battery, resulting in difficulty in extending the discharge duration.

Based on the foregoing conclusion, the inventors have invented AA and AAA alkaline batteries capable of enhancing not only their discharge characteristics in the low-rate current range but also discharge characteristics in the middle-rate current range. Hereinafter, an embodiment of the present invention will be described with reference to the drawings. It should be noted that the present invention is not limited to the following embodiment.

The FIGURE is a half sectional view illustrating an alkaline battery according to an embodiment of the present invention.

As illustrated in the FIGURE, the alkaline battery of this embodiment includes a cylindrical battery case 1 which is sealed at one end (i.e., at the lower end in the FIGURE). The outer surface of the battery case 1 is covered with an exterior label 8. The battery case 1 serves as a positive electrode terminal and a positive electrode current collector. A hollow cylindrical positive electrode 2 is inscribed in the battery case 1. A separator 4 is provided in the hollow portion of the positive electrode 2, and is formed in the shape of a cylinder which is sealed at one end. A negative electrode 3 is placed in the hollow portion of the separator 4. Accordingly, the battery case 1 is configured such that the positive electrode 2, the separator 4, and the negative electrode 3 are arranged in this order from the periphery to the center thereof.

The opening (i.e., the upper end in the FIGURE) of the battery case 1 is sealed by an assembled sealing unit 9. The assembled sealing unit 9 is configured by integrating a nail-shaped negative electrode current collector 6, a negative electrode terminal plate 7, and a resin gasket 5. The negative electrode terminal plate 7 is electrically connected to the negative electrode current collector 6. The resin gasket 5 is fixed to the negative electrode current collector 6 and the negative electrode terminal plate 7.

The battery case 1 is obtained by, for example, press-molding a nickel-coated steel plate into a predetermined shape having predetermined dimensions with a known method disclosed in, for example, Japanese Laid-Open Patent Publications Nos. 60-180058 and 11-144690.

The positive electrode 2 contains a mixture of a positive electrode active material such as electrolytic manganese dioxide powder, a conductive agent such as graphite powder, and an alkaline electrolyte. A binder such as polyethylene powder or a lubricant such as stearate may be added to the positive electrode 2 as necessary. The positive electrode 2 will be described later.

The negative electrode 3 is obtained by, for example, adding a gelling agent such as sodium polyacrylate to the alkaline electrolyte and dispersing zinc alloy particles in the resultant gelled alkaline electrolyte. To increase the corrosion resistance of the negative electrode 3, a metal compound, such as indium or bismuth, having a high hydrogen overvoltage may be added to the negative electrode 3 as necessary. To suppress zinc dendrite formation, a trace amount of a silicon compound such as silicic acid or silicate may be added to the negative electrode 3 as necessary.

As the separator 4, nonwoven fabric obtained by mixing mainly polyvinyl alcohol fiber and rayon fiber is used, for example. The separator 4 is obtained with a known method disclosed in, for example, Japanese Laid-Open Patent Publications Nos. 6-163024 and 2006-32320.

The positive electrode 2, the negative electrode 3, and the separator 4 contain an alkaline electrolyte (not shown). The alkaline electrolyte contains 30 wt % to 40 wt % of potassium hydroxide and 1 wt % to 3 wt % of zinc oxide.

The resin gasket 5 includes a through hole into which the negative electrode current collector 6 is press fitted, an annular thinner portion, and an outer circumferential end portion. The annular thinner portion is located around the through hole and functions as a safety valve. The outer circumferential end portion is formed along the periphery of the annular thinner portion, and is continuous to the annular thinner portion. The resin gasket 5 is obtained by, for example, injection-molding a material such as nylon or polypropylene into a predetermined shape having predetermined dimensions.

The negative electrode current collector 6 is obtained by press-molding a wire material of, for example, copper or brass into a nail shape having predetermined dimensions. The surface of the negative electrode current collector 6 is preferably plated with, for example, tin or indium.

The negative electrode terminal plate 7 includes a terminal portion for sealing the opening of the battery case 1 and a circumferential flange portion. The circumferential flange portion extends from the terminal portion, and is in contact with the resin gasket 5. The circumferential flange portion has a plurality of gas holes (not shown) for reducing the internal pressure of the alkaline battery when the safety valve of the resin gasket 5 is actuated. The negative electrode terminal plate 7 is obtained by, for example, press-molding a nickel-coated or tin-coated steel plate into a predetermined shape having predetermined dimensions.

In fabricating such an alkaline battery, in general, components such as the positive electrode 2, the negative electrode 3, and the separator 4 are housed in the battery case 1, and then the opening of the battery case 1 is covered with the assembled sealing unit 9.

Now, the positive electrode 2 of this embodiment is described.

The positive electrode 2 of this embodiment contains a larger amount of manganese dioxide than that in a conventional battery. Specifically, the loading weight of manganese dioxide per one AA alkaline battery is about 8.80 g in a conventional battery, but is 9.30 g or more in this embodiment. The loading weight of manganese dioxide per one AAA alkaline battery is about 4.04 g in a conventional battery, but is 4.09 g or more in this embodiment. Accordingly, discharge characteristics of the alkaline battery in the low-rate current range can be enhanced.

As described above, the positive electrode 2 of this embodiment contains graphite. The amount of graphite is about 4.5 wt % of the weight of manganese dioxide in a conventional battery, but is in the range from 4.5 wt % to 7.0 wt %, both inclusive, (more preferably in the range from 5.0 w % to 6.5 wt %, both inclusive) of the weight of manganese dioxide in this embodiment. Accordingly, electron conductivity in the positive electrode 2 can be enhanced.

In addition, the cumulative pore volume of pores having diameters from 0.97 µm to 10.2 µm, both inclusive, is in the range from 0.0035 ml/g to 0.0070 ml/g, both inclusive, in measurement of pore size distribution in the positive electrode 2 performed by mercury intrusion porosimetry. In this manner, in the positive electrode 2 of this embodiment, the number of gaps having a specific range of diameters is larger than that in a conventional positive electrode. Accordingly, filling of the gaps can be suppressed even with expansion of manganese dioxide due to discharge, and a relatively large number of gaps can be left unfilled. Accordingly, in the positive electrode 2, diffusion paths for the alkaline electrolyte can be assured even with expansion of manganese dioxide due to discharge. Thus, in the alkaline battery of this embodiment, a decrease in the diffusion rate of the alkaline electrolyte caused by expansion of manganese dioxide is suppressed, thus enhancing discharge characteristics in the middle-rate current range.

To enhance discharge characteristics of the alkaline battery in the middle-rate current range, a large number of large gaps are preferably formed in the positive electrode 2. The gaps are preferably large because such gaps can be formed in the positive electrode 2 without difficulty. However, when an extremely large number of excessively-large gaps are formed in a positive electrode, the loading weight of manganese dioxide in the positive electrode decreases, thus making it difficult to increase the capacity of the alkaline battery. In this manner, the pursuit of enhancement of discharge characteristics of the alkaline battery in the middle-rate current range raises difficulties in increasing the capacity of the battery. In contrast, the pursuit of increase in capacity raises difficulties in enhancing discharge characteristics in the middle-rate current range. However, as long as the cumulative pore volume of pores having diameters from 0.97 µm to 10.2 µm, both inclusive, is in the range from 0.0035 ml/g to 0.0070 ml/g, both inclusive, in measurement of pore size distribution in the positive electrode 2 performed by mercury intrusion porosimetry, it is possible to enhance discharge characteristics of the alkaline battery in the middle-rate current range, while increasing the capacity of the battery.

The cumulative pore volume of pores having diameters from 0.97 µm to 10.2 µm, both inclusive, can be calculated from data on pore size distribution in the positive electrode 2 obtained by mercury intrusion porosimetry. Specifically, this calculation is performed in the following manner: For example, using the obtained data on pore size distribution in the positive electrode 2, the volumes of pores having diameters from the maximum value to 0.97 µm are summed up and the volumes of pores having diameters from the maximum value to 10.2 µm are summed up. Then, the cumulative pore volume of pores having diameters from the maximum value to 10.2 µm is subtracted from the cumulative pore volume of pores having diameters from the maximum value to 0.97 µm. In calculating the cumulative pore volume, it is preferable to use the weight of the dried positive electrode material mixture pellet as a reference (denominator).

The measurement of the pore size distribution in the positive electrode 2 by mercury intrusion porosimetry is performed in the following manner: For example, a positive electrode material mixture pellet is taken out from the battery case 1, and is then dried. This dried positive electrode material mixture pellet is cut into a doughnut-shaped positive electrode material mixture. The doughnut-shaped positive electrode material mixture is then cut in such a manner that the bottom of this mixture is equally divided into, for example, three parts, and two of these three parts are placed in a measurement cell in a pore size distribution analyzer using mercury intrusion porosimetry for measurement.

The positive electrode 2 is preferably formed in the following manner: First, with a conventional method, pressure is applied to positive electrode material mixture powder, thereby forming a positive electrode material mixture pellet. This positive electrode material mixture pellet is placed in a battery case 1.

Next, pressure is applied again to the positive electrode material mixture pellet along the axis of the mixture pellet with the outside of the battery case 1 fixed with a metal base. The pressure in this repressurization is preferably in the range from 0.7 t to 1.2 t, both inclusive, in forming a positive electrode 2 of an AA alkaline battery, and is preferably in the range from 0.35 t to 0.7 t, both inclusive, in forming a positive electrode 2 of an AAA alkaline battery. When such a pressure is applied to the positive electrode material mixture pellet, the positive electrode material mixture pellet is temporally cracked, but is reconstructed again. In this manner, a larger number of larger gaps can be formed in the positive electrode material mixture pellet, than in a conventional battery. In addition, a decrease in the loading weight of, for example, an active material caused by an excessively large number of gaps is avoided. Since the positive electrode 2 of this embodiment is formed in the manner described above, the number and size of gaps in the positive electrode 2 are greater than those in a conventional battery.

Examples of conventional methods for forming a positive electrode 2 include: a technique of repressurizing a positive electrode material mixture pellet (for example, Japanese Laid-Open Patent Publication No. 2000-100394) as in this embodiment; and a technique of housing a positive electrode material mixture pellet in a battery case without repressurization. In the latter technique, cracks due to repressurization cannot be formed in the positive electrode material mixture pellet, and thus, unlike the positive electrode 2 of this embodiment, a large number of large gaps cannot be formed. Accordingly, in a positive electrode formed by the latter technique, expansion of manganese dioxide causes gaps in the positive electrode to be crushed. As a result, it is difficult to enhance discharge characteristics of the alkaline battery in the middle-rate current range.

On the other hand, with the former technique, cracks due to repressurization can be formed in a positive electrode material mixture pellet as in this embodiment. However, in a conventional method, repressurization is performed for the purpose of bringing a positive electrode into close contact with the inner surface of a battery case. Therefore, a pressure of about 1.6 t is applied to the positive electrode material mixture pellet in forming a positive electrode of an AA alkaline battery, and a pressure of about 0.85 t is applied to the positive electrode material mixture pellet in forming a positive electrode of an AAA alkaline battery. When such high pressure is applied to the positive electrode material mixture pellet, not only the positive electrode material mixture pellet is cracked, but also the cracked positive electrode material mixture is compressed at a high density again to be disadvantageously a positive electrode material mixture pellet including no large gaps. Accordingly, even with the conventional repressurization technique, it is difficult to form a large number of large gaps in the positive electrode. Therefore, in the positive electrode formed with the conventional repressurization technique, when manganese dioxide is expanded, gaps in the positive electrode are crushed. As a result, it is difficult to enhance discharge characteristics of the alkaline battery in the middle-rate current range.

In this embodiment, however, the positive electrode material mixture pellet is repressurized by adjusting pressure in such a manner that cracks are formed in the positive electrode material mixture pellet and that the once-formed cracks do not disappear. Accordingly, the number and size of gaps in the positive electrode 2 are greater than those in a conventional positive electrode. In other words, it is possible to obtain the positive electrode 2 in which the cumulative pore volume of pores having diameters from 0.97 µm to 10.2 µm, both inclusive, is in the range from 0.0035 ml/g to 0.0070 ml/g, both inclusive, in measurement of pore size distribution in the positive electrode 2 performed by mercury intrusion porosimetry. In this manner, in the positive electrode 2, even when manganese dioxide is expanded by discharge, shrinkage and disappearing of gaps are prevented, thus ensuring diffusion paths for the alkaline electrolyte. As a result, discharge characteristics of the alkaline battery of this embodiment in the middle-rate current range can be enhanced.

In the method for forming the positive electrode 2 of this embodiment, since pressure during repressurization is lower than that in a conventional method, there is apprehension that the contact of the positive electrode 2 with the inner surface of the battery case 1 might be weaker. However, the addition of polyethylene powder to the positive electrode 2 can maintain the close contact of the positive electrode 2 with the inner surface of the battery case 1.

When the positive electrode material mixture pellet is repressurized with a stem inserted into the hollow portion of the positive electrode material mixture pellet, the hollow portion of the positive electrode material mixture pellet is not crushed, and cracks are formed in the positive electrode material mixture pellet. As a result, components such as the separator 4 and the negative electrode 3 can be easily placed in the hollow portion of the positive electrode 2.

As described above, since the positive electrode 2 of this embodiment contains a larger amount of manganese dioxide than in a conventional battery, the alkaline battery of this embodiment can enhance its discharge characteristics in the low-rate current range.

In addition, the number and size of gaps in the positive electrode 2 of this embodiment are greater than those in a conventional positive electrode. Accordingly, discharge characteristics in the middle-rate current range can be enhanced.

The inventors actually confirmed effects of the alkaline battery of this embodiment. Specifically, the AA alkaline battery of this embodiment was intermittently discharged with a current of 250 mA in an atmosphere of 20° C. for one hour per a day in conformity with IEC standard 60086-2. Then, the discharge capacity per a unit weight of manganese dioxide was 230 mAh/g or more. On the other hand, the discharge capacity of a conventional AA alkaline battery in the middle-rate current range is about 220 mAh/g per a unit weight of manganese dioxide. Therefore, it was confirmed that the AA alkaline battery of this embodiment exhibits better discharge characteristics in the middle-rate current range than the conventional battery.

In the same manner, the AAA alkaline battery of this embodiment was intermittently discharged with a current of 100 mA in an atmosphere of 20° C. for one hour per a day in conformity with ANSI standard C18.1M, Part1-2005. Then, the discharge capacity per a unit weight of manganese dioxide was 260 mAh/g or more. On the other hand, the discharge capacity of a conventional AAA alkaline battery in the middle-rate current range was about 240 mAh/g per a unit weight of manganese dioxide. Therefore, it was confirmed that the AAA alkaline battery of this embodiment exhibits better discharge characteristics in the middle-rate current range than the conventional battery.

EXAMPLES

In the following examples, alkaline batteries were prepared, and discharge characteristics of these alkaline batteries in the low-rate current range and the middle-rate current range were evaluated. In addition, the cumulative pore volumes of positive electrodes of the alkaline batteries were also measured.

Methods of Experiment (1) Method for Fabricating an Alkaline Battery (a) AA Alkaline Battery Example 1-1

First, zinc alloy powder containing 0.005 wt % of Al, 0.005 wt % of Bi, and 0.020 wt % of In with respect to the weight of zinc was prepared by a gas atomizing method. Then, this zinc alloy powder was classified with a screen. With this classification, the zinc alloy powder was adjusted in such a manner that the zinc alloy powder had a grain size of 70 to 300 meshes and that the ratio of zinc alloy powder having a grain diameter of 200 meshes (i.e., 75 μm) or less was 30%, thereby obtaining a negative electrode active material.

Next, polyacrylic acid and sodium polyacrylate were added to, and mixed with, 100 weight parts of 34.5 wt % of a potassium hydroxide aqueous solution (containing 2 wt % of ZnO) in such a manner that the total weight was 2.2 weight parts, and the resultant mixture was made into gel, thereby obtaining a gelled electrolyte. Thereafter, this gelled electrolyte was left alone for 24 hours to be sufficiently matured.

Then, the zinc alloy powder in an amount 2.00 times as much as a given amount of the gelled electrolyte in weight ratio, 0.025 weight part of indium hydroxide (0.016 weight part as metal indium) with respect to 100 weight parts of the zinc alloy powder, and 0.1 weight part of an anionic surfactant (e.g., alcohol sodium phosphate ester having an average molecular weight of about 210) were added to, and were sufficiently mixed with, the gelled electrolyte, thereby obtaining a gelled negative electrode.

Thereafter, electrolytic manganese dioxide (HHTF: a product by TOSOH CORPORATION) and graphite (SP-20: a product by Nippon Graphite Industries, ltd.) were blended at a weight ratio of 94:6, thereby obtaining mixed powder. With 100 weight parts of this mixed powder, 1.5 weight parts of an electrolyte (e.g., 39 wt % of a potassium hydroxide aqueous solution containing 1 wt % of ZnO) and 0.2 weight part of a polyethylene binder were mixed. Then, the mixture was uniformly stirred and mixed by a mixer, and was sized to have a given grain size. The obtained grain substance was press formed into a hollowed cylindrical shape. In this manner, a positive electrode mixture in the form of a pellet was obtained.

The weight of manganese dioxide in the above case is based on the assumption that the purity of manganese dioxide is 100%. The purity of electrolytic manganese dioxide in the above case is 92.2%. For example, 11.28 g of the positive electrode material mixture pellet having the aforementioned composition contains 10.42 g (=11.28×94÷(94+6+1.5+0.2)) of electrolytic manganese dioxide and 9.61 g (=10.42×0.922) of manganese dioxide.

Subsequently, a sample AA alkaline battery was prepared. Specifically, as illustrated in the FIGURE, two pellets of the positive electrode mixture (weight: 5.64 g per one pellet) obtained in the manner described above were inserted into the battery case 1, and pressure was applied to the pellets again in the battery case 1, thereby bringing the pellets into close contact with the inner surface of the battery case 1. At this time, the positive electrode mixture pellets were repressurized under a pressure of 1.2 t. Then, a separator 4 and a bottom insulator for insulating the bottom of the battery case 1 were placed inside the positive electrode mixture pellets. Thereafter, 1.5 g of the electrolyte was injected. After the injection, the inside of the separator 4 was filled with a gelled negative electrode 3. Subsequently, the opening of the battery case 1 was sealed by an assembled sealing unit 9 formed by integrating a resin gasket 5, a negative electrode current collector 6, and a negative electrode terminal plate 7. Specifically, the negative electrode current collector 6 was inserted in the negative electrode 3, and the circumferential flange portion of the negative electrode terminal plate 7 was crimped to the rim of the opening of the battery case 1 with the outer circumferential end portion of the resin gasket 5 interposed therebetween, thereby bringing the negative electrode terminal plate 7 into close contact with the opening of the battery case 1. Then, the outer surface of the battery case 1 was covered with an exterior label 8, thus completing an AA alkaline battery according to Example 1-1.

Example 1-2

An AA alkaline battery according to Example 1-2 was fabricated in the same manner as in Example 1-1 except for that positive electrode material mixture pellets were repressurized under a pressure of 0.7 t.

Comparative Example 1-1

An AA alkaline battery according to Comparative Example 1-1 was fabricated in the same manner as in Example 1-1 except for that the weight of manganese dioxide contained in an alkaline battery was 9.3 g and positive electrode material mixture pellets were not repressurized.

Comparative Example 1-2

An AA alkaline battery according to Comparative Example 1-2 was fabricated in the same manner as in Example 1-1 except for that the weight of manganese dioxide contained in an alkaline battery was 10.28 g and positive electrode material mixture pellets were not repressurized.

Comparative Example 1-3

An AA alkaline battery according to Comparative Example 1-3 was fabricated in the same manner as in Example 1-1 except for that the weight of manganese dioxide contained in an alkaline battery was 8.80 g and positive electrode material mixture pellets were repressurized under a pressure of 1.6 t.

(b) AAA Alkaline Battery

Example 2-1

An AAA alkaline battery according to Comparative Example 2-1 was fabricated in the same manner as in Example 1-1 except for that the weight of one positive electrode material mixture pellet was 2.45 g, the weight of manganese dioxide contained in an alkaline battery was 4.18 g, and positive electrode material mixture pellets were repressurized under a pressure of 0.68 t.

Example 2-2

An AAA alkaline battery according to Comparative Example 2-2 was fabricated in the same manner as in Example 1-1 except for that the weight of one positive electrode material mixture pellet was 2.45 g, the weight of manganese dioxide contained in an alkaline battery was 4.18 g, and positive electrode material mixture pellets were repressurized under a pressure of 0.4 t.

Comparative Example 2-1

An AAA alkaline battery according to Comparative Example 1-4 was fabricated in the same manner as in Example 1-1 except for that the weight of one positive electrode material mixture pellet was 2.36 g, the weight of manganese dioxide contained in an alkaline battery was 4.02 g, and positive electrode material mixture pellets were not repressurized.

Comparative Example 2-2

An AAA alkaline battery according to Comparative Example 2-2 was fabricated in the same manner as in Example 1-1 except for that the weight of one positive electrode material mixture pellet was 2.47 g, the weight of manganese dioxide contained in an alkaline battery was 4.21 g, and positive electrode material mixture pellets were not repressurized.

Comparative Example 2-3

An AAA alkaline battery according to Comparative Example 2-3 was fabricated in the same manner as in Example 1-1 except for that the weight of one positive electrode material mixture pellet was 2.37 g, the weight of manganese dioxide contained in an alkaline battery was 4.04 g, and positive electrode material mixture pellets were repressurized under a pressure of 0.85 t.

(2) Method for Evaluating Discharge Characteristics in the Low-Rate Current Range Low-rate current was caused to flow in each of AA and AAA alkaline batteries fabricated in the fabrication methods described above, thereby measuring discharge duration for these batteries.

(a) AA Alkaline Battery

An AA alkaline battery fabricated by the aforementioned fabrication method was discharged for four hours per a day in an atmosphere of 20° C. with a load of a resistance having a resistance value of 43Ω. Then, the time (discharge duration) necessary for the closed circuit voltage to fall below the end voltage (0.9 V) was measured.

(b) AAA Alkaline Battery

An AAA alkaline battery fabricated by the aforementioned fabrication method was discharged for four hours per a day in an atmosphere of 20° C. with a load of a resistance having a resistance value of 75Ω. Then, the time (discharge duration) necessary for the closed circuit voltage to fall below the end voltage (0.9 V) was measured.

(3) Method for Evaluating Discharge Characteristics in the Middle-Rate Current Range Middle-rate current was caused to flow intermittently in each of AA and AAA alkaline batteries fabricated in the fabrication methods described above, thereby measuring discharge duration for these batteries. Using this discharge duration, discharge capacity was calculated.

(a) AA Alkaline Battery

The AA alkaline battery fabricated by the aforementioned fabrication method was intermittently discharged with a current of 250 mA in an atmosphere of 20° C. for one hour per a day in conformity with IEC standard 60086-2. Then, the time (discharge duration) necessary for the closed circuit voltage to fall below the end voltage (0.9 V) was measured. Using the weight of manganese dioxide and the obtained discharge duration, the discharge capacity per a unit weight of manganese dioxide in the middle-rate current range was calculated as follows:

(discharge capacity)=(discharge duration)×250 (mA)÷(manganese dioxide weight) (g)

where manganese dioxide weight is the weight of manganese dioxide contained in one alkaline battery.

(b) AAA Alkaline Battery

The AAA alkaline battery fabricated by the aforementioned fabrication method was intermittently discharged with a current of 100 mA in an atmosphere of 20° C. for one hour per a day in conformity with ANSI standard C18.1M, Part1-2005. Then, the time necessary for the closed circuit voltage to fall below the end voltage (0.9 V) was measured. Using the weight of manganese dioxide and the obtained discharge duration, the discharge capacity in the middle-rate current range was calculated as follows:

(discharge capacity)=(discharge duration)×100 (mA)÷(manganese dioxide weight) (g)

where manganese dioxide weight is the weight of manganese dioxide contained in one alkaline battery as described above.

(4) Measurement of the Cumulative Pore Volume in Positive Electrode

A positive electrode was taken out from each of AA and AAA alkaline batteries fabricated in the fabrication methods described above, and the cumulative pore volume of pores having diameters from 0.97 μm to 10.2 μm, both inclusive, was measured with a pore size distribution analyzer (SIMAZU AUTOPORE 9520) using mercury intrusion porosimetry.

First, AA and AAA alkaline batteries were fabricated by the aforementioned fabrication method, and then were stored at room temperature for a period from two months to six months, both inclusive. Thereafter, the battery case of each of the batteries was cut open, and a positive electrode material mixture pellet was taken out.

Next, the positive electrode material mixture pellet was placed in a vacuum dryer, and was dried at room temperature for 12 hours.

Then, the positive electrode material mixture pellet was cut into a doughnut-shaped positive electrode material mixture having a thickness of 10 mm. Specifically, the positive electrode material mixture pellet was cut at a portion thereof at a distance of 15 mm from the sealed portion (i.e., a portion covered with the assembled sealing unit 9) of the alkaline battery. Subsequently, the positive electrode material mixture pellet was cut again at a portion thereof 10 mm below the previously-cut section.

Thereafter, the doughnut-shaped positive electrode material mixture was cut in such a manner that the bottom thereof was equally divided into three parts, and two of these three parts were placed in a measurement cell of a pore size distribution analyzer using mercury intrusion porosimetry. In calculating the cumulative pore volume, the weight of the positive electrode material mixture pellet dried by the vacuum dryer was used as the denominator. As a measurement condition, an initial mercury pressure was 7 kPa (1 psia). The mercury pressure of 7 kPa means that mercury is capable of being intruded in pores with a diameter of 180 μm.

Results and Considerations (a) AA Alkaline Battery

Table 1 shows results.

became difficult to maintain diffusion paths for the alkaline electrolyte in the positive electrode.

Next, discharge characteristics of the AA alkaline batteries in the middle-rate current range are considered.

In Examples 1-1 and 1-2, discharge durations in the middle-rate current range were longer than those in Comparative Examples 1-1 to 1-3, and discharge capacities in the middle-rate current range were larger than those in Comparative Examples 1-1 to 1-3. This is considered to be because the cumulative pore volumes of the positive electrodes in Examples 1-1 and 1-2 were larger than those in Comparative Examples 1-1 to 1-3.

In Comparative Examples 1-1 and 1-2, the positive electrode material mixture pellet was placed in the battery case without repressurization. In Comparative Example 1-3, the positive electrode material mixture pellet was repressurized under a pressure higher than those in Examples 1-1 and 1-2. However, in either case of Comparative Examples, the cumulative pore volume did not exceed those in Examples 1-1 and 1-2. This is considered to be because of the following reason:

TABLE 1

| | manganese dioxide weight (g) | low-rate current range discharge duration (time) | middle-rate current range (intermittent discharge) discharge duration (time) | middle-rate current range (intermittent discharge) discharge capacity (mAh/g) | cumulative pore volume (ml/g) |
|---|---|---|---|---|---|
| Example 1-1 | 9.61 | 99.6 | 9.6 | 249 | 0.0060 |
| Example 1-2 | 9.61 | 99.7 | 9.5 | 248 | 0.0061 |
| Comparative Example 1-1 | 9.30 | 97.6 | 8.3 | 223 | 0.0021 |
| Comparative Example 1-2 | 10.28 | 97.7 | 9.2 | 225 | 0.0033 |
| Comparative Example 1-3 | 8.80 | 91.6 | 7.7 | 219 | 0.0046 |

First, discharge characteristics of AA alkaline batteries in the low-rate current range are considered.

In Examples 1-1 and 1-2, the loading weights of manganese dioxide were larger than those in Comparative Examples 1-1 and 1-3. Thus, discharge durations in the low-rate current range in Examples 1-1 and 1-2 were longer than those in Comparative Examples 1-1 and 1-3.

In Comparative Example 1-2, although the loading weight of manganese dioxide was larger than those in Examples 1-1 and 1-2, discharge duration in the low-rate current range was shorter than those in Examples 1-1 and 1-2. This is considered to be because the large loading weight of manganese dioxide in Comparative Example 1-2 increased the expansion amount of manganese dioxide during discharge and, as a result, it As described in the foregoing embodiment, cracks due to repressurization cannot be formed in the positive electrode material mixture pellet unless the positive electrode material mixture pellet is not repressurized. In contrast, when the positive electrode material mixture pellet is repressurized under a high pressure, the positive electrode material mixture pellet is cracked, but is subsequently compressed at a high density again. Accordingly, the cracks formed in the positive electrode material mixture pellet disappear.

(b) AAA Alkaline Battery

Table 2 shows results.

TABLE 2

| | manganese dioxide weight (g) | low-rate current range discharge duration (time) | middle-rate current range (intermittent discharge) discharge duration (time) | middle-rate current range (intermittent discharge) discharge capacity (mAh/g) | cumulative pore volume (ml/g) |
|---|---|---|---|---|---|
| Example 2-1 | 4.18 | 74.6 | 11.4 | 273 | 0.0060 |
| Example 2-2 | 4.18 | 74.5 | 11.3 | 270 | 0.0061 |
| Comparative Example 2-1 | 4.02 | 72.4 | 9.6 | 240 | 0.0021 |
| Comparative Example 2-2 | 4.21 | 74.4 | 10.8 | 256 | 0.0033 |
| Comparative Example 2-3 | 4.04 | 73.4 | 10.4 | 257 | 0.0046 |

For AAA alkaline batteries, results showing similar tendencies to those of the results on the AA alkaline batteries were obtained. Therefore, measures for improving discharge characteristics in the low- and middle-rate current ranges of an AA alkaline battery are also applicable to an AAA alkaline battery.

What is claimed is:

1. An AA alkaline battery, comprising a positive electrode containing larger than or equal to 9.30 g of manganese dioxide, wherein
    a cumulative pore volume of pores having diameters from 0.97 μm to 10.2 μm, both inclusive, is in the range from 0.0035 ml/g to 0.0070 ml/g, both inclusive, in measurement of pore size distribution in the positive electrode performed by mercury intrusion porosimetry.

2. The AA alkaline battery of claim 1, wherein the positive electrode contains graphite in the range from 4.5 wt % to 7.0 wt %, both inclusive, of a weight of manganese dioxide contained in the positive electrode.

3. The AA alkaline battery of claim 1, wherein a discharge capacity per a unit weight of manganese dioxide contained in the positive electrode is larger than or equal to 230 mAh/g in a case of performing intermittent discharge with a current of 250 mA in an atmosphere of 20° C. for one hour per a day.

4. An AAA alkaline battery, comprising a positive electrode containing larger than or equal to 4.09 g of manganese dioxide, wherein
    a cumulative pore volume of pores having diameters from 0.97 μm to 10.2 μm, both inclusive, is in the range from 0.0035 ml/g to 0.0070 ml/g, both inclusive, in measurement of pore size distribution in the positive electrode performed by mercury intrusion porosimetry.

5. The AAA alkaline battery of claim 4, wherein the positive electrode contains graphite in the range from 4.5 wt % to 7.0 wt %, both inclusive, of a weight of manganese dioxide contained in the positive electrode.

6. The AAA alkaline battery of claim 4, wherein discharge capacity per a unit weight of manganese dioxide contained in the positive electrode is larger than or equal to 260 mAh/g in a case of performing intermittent discharge with a current of 100 mA in an atmosphere of 20° C. for one hour per a day.

* * * * *